(12) United States Patent
Koizumi

(10) Patent No.: US 11,863,637 B2
(45) Date of Patent: Jan. 2, 2024

(54) OFFICE DEVICE, OFFICE DEVICE SYSTEM, CONTROL METHOD USING OFFICE DEVICE, AND WIRELESS DEVICE TRACKING METHOD

(71) Applicant: TOSHIBA TEC KABUSHIKI KAISHA, Tokyo (JP)

(72) Inventor: Shinji Koizumi, Numazu Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/942,640

(22) Filed: Sep. 12, 2022

(65) Prior Publication Data
US 2023/0100233 A1     Mar. 30, 2023

(30) Foreign Application Priority Data
Sep. 16, 2021 (JP) ................................. 2021-150884

(51) Int. Cl.
| | | |
|---|---|---|
| *H04L 12/12* | (2006.01) | |
| *H04L 67/52* | (2022.01) | |
| *H04L 12/28* | (2006.01) | |
| *H04L 67/12* | (2022.01) | |

(52) U.S. Cl.
CPC .......... *H04L 67/52* (2022.05); *H04L 12/2818* (2013.01); *H04L 67/12* (2013.01); *H04L 2012/2841* (2013.01)

(58) Field of Classification Search
CPC ..... H04L 67/52; H04L 12/2818; H04L 67/12; H04L 2012/2841
USPC .......................................................... 709/203
See application file for complete search history.

(56) References Cited

U.S. PATENT DOCUMENTS

| | | | |
|---|---|---|---|
| 10,416,943 B2 | 9/2019 | Maeshima | |
| 10,854,025 B2* | 12/2020 | Einberg | H04W 12/065 |
| 11,070,622 B2 | 7/2021 | Kurihara et al. | |
| 11,178,028 B1* | 11/2021 | Maseedu | H04L 43/06 |
| 2019/0394817 A1* | 12/2019 | Bailey | H04W 4/80 |
| 2020/0273352 A1* | 8/2020 | Kahn | H04B 7/18508 |
| 2020/0413317 A1* | 12/2020 | Gao | H04W 36/00837 |
| 2021/0312228 A1* | 10/2021 | Igarashi | H04W 4/44 |

FOREIGN PATENT DOCUMENTS

| | | |
|---|---|---|
| JP | 2017016257 A | 1/2017 |
| JP | 2020092360 A | 6/2020 |

* cited by examiner

*Primary Examiner* — Jude Jean Gilles
(74) *Attorney, Agent, or Firm* — Kim & Stewart LLP

(57) ABSTRACT

According to one embodiment, an office device includes a communication unit to wirelessly communicate with a wireless device using a short-range wireless communication standard. A processor of the office device is configured to periodically search for wireless devices within a communication range of the communication unit, acquire identification information from each wireless device detected in the search for wireless devices, output search data including the identification information to a server. In some examples, the office device may be used as a monitoring sensor or the like to provide information for control of another apparatus.

20 Claims, 10 Drawing Sheets

FIG. 5

| TARGET PERSON ID | NAME | COMMUNICATION ADDRESS | ATTRIBUTE |
|---|---|---|---|

ROOM NAME: ROOM A (242, 2421)

| MFPID | NUMBER OF TARGET PERSONS | NUMBER OF NON-TARGET PERSONS | TOTAL NUMBER OF PERSONS | AIR CONDITIONER | LIGHTING |
|---|---|---|---|---|---|
| 1001 | 0 | 1 | 6 | X% | ON/OFF |
| 1002 | 3 | 0 | | | |
| 1003 | 1 | 0 | | | |
| 1004 | 0 | 1 | | | |

2422  2423  2424  2425  2426  2427

OFFICE DEVICE, OFFICE DEVICE SYSTEM, CONTROL METHOD USING OFFICE DEVICE, AND WIRELESS DEVICE TRACKING METHOD

CROSS-REFERENCE TO RELATED APPLICATION

This application is based upon and claims the benefit of priority from Japanese Patent Application No. 2021-150884, filed Sep. 16, 2021, the entire contents of which are incorporated herein by reference.

FIELD

Embodiments described herein relate generally to an office device functioning as a monitoring sensor, an office device system including such an office device, a control method using monitoring information from the office device for controlling another apparatus, and a wireless device tracking method using the office device.

BACKGROUND

In recent years, there have been developed office devices such as multifunction peripherals (MFPs), copiers, printers, facsimile machines and the likes equipped with communication units operating on wireless communication standards such as Bluetooth®. This type of office device can receive data by wireless communication from a wireless device such as a personal computer, a tablet terminal, or a smartphone, and perform processing such as image formation, printing, and communication.

There is a desire to use this type of office device to monitor a location at which the office device is installed.

BRIEF DESCRIPTION OF THE DRAWINGS

FIG. 5 is a schematic diagram illustrating a configuration of a target person record.
FIG. 6 is a configuration example of a room-specific management table for a particular room.

DETAILED DESCRIPTION

An embodiment provides an office device which can be used to monitor an installation location, an office device system which can monitor a location where an office device is installed, a method for controlling other devices/equipment (control targets) using an office device as sensor, and a wireless device management method using an office device as sensor.

In general, according to one embodiment, an office device includes a communication unit to wirelessly communicate with a wireless device using a predetermined short-range wireless communication standard. A processor of the office device is configured to periodically search for wireless devices within a communication range of the communication unit, acquire identification information from each wireless device detected in the search for wireless devices, output search data including the identification information to a server.

Hereinafter, certain example embodiments of an office device system will be described with reference to the drawings.

Configuration of Office Device System

Figure 1:
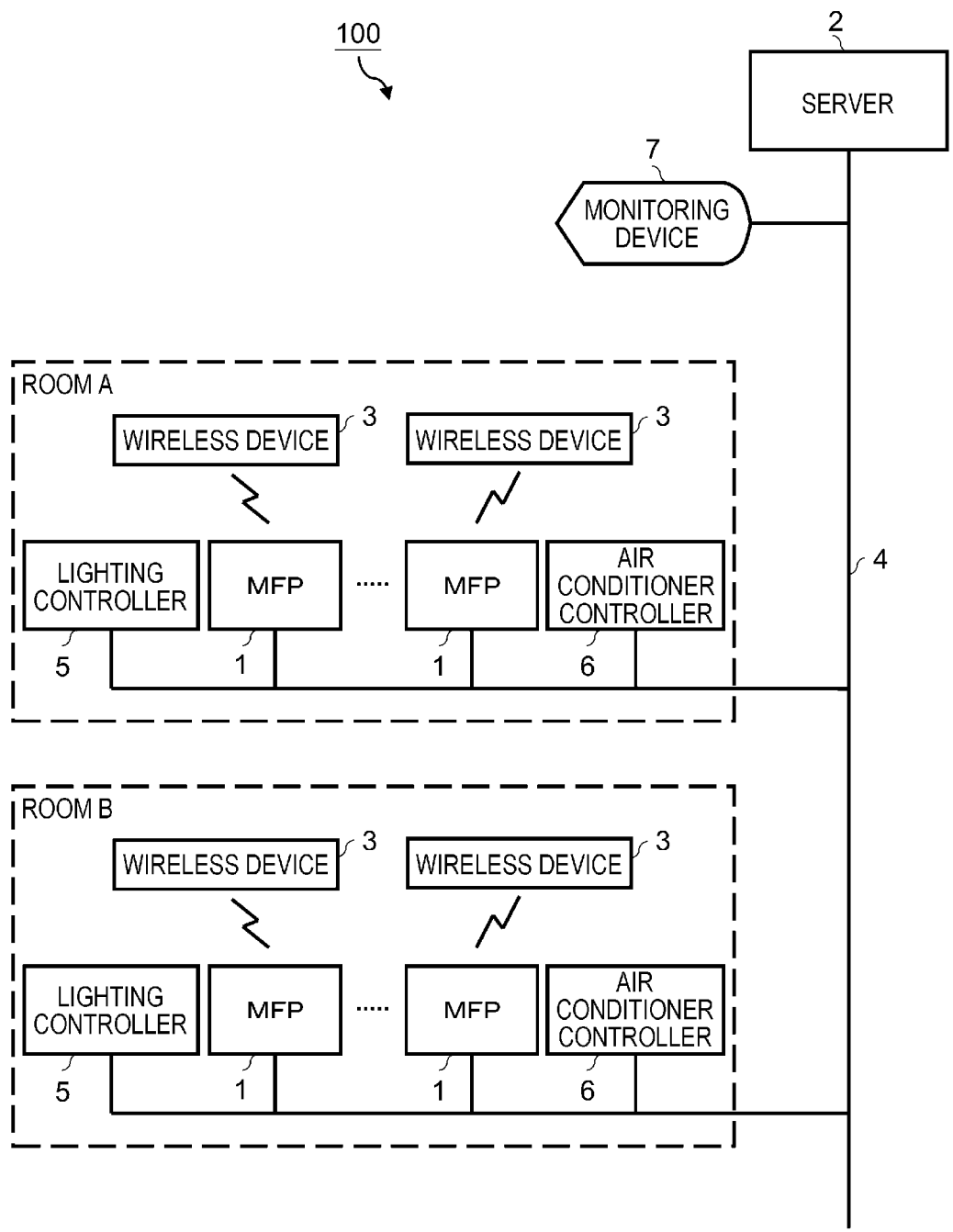
FIG. 1 is a block diagram illustrating a schematic configuration of an office device system.

FIG. 1 is a block diagram illustrating a schematic configuration of an office device system 100. The office device system 100 includes an MFP 1 as an office device and a server 2. The MFP 1 is typically for business use. An MFP 1 for business use is generally installed and used in a place such as a working room of an office, a conference room, or a drawing room. FIG. 1 illustrates a case where a plurality of MFPs 1 are installed in each of a room A and a room B.

The MFP 1 can receive data from a Bluetooth compatible wireless device 3 such as a personal computer, a tablet terminal, or a smartphone by short-range wireless communication using Bluetooth as a communication standard, and can perform data processing such as image formation, printing, and facsimile communication.

The MFP 1 of each of the rooms A and B and the server 2 are connected by a network 4. The network 4 is typically a local area network (LAN). The LAN may be a wired LAN or a wireless LAN. The network 4 may instead be a wide-area network in which a public line or a dedicated line is used as a relay network with a wired LAN, a wireless LAN, a mobile communication network, a mobile phone communication network, or the like is used as an access network.

Each of the rooms A and B has a lighting controller 5 and an air conditioner controller 6. The lighting controller 5 controls the on and off of lighting fixtures provided in the room. The lighting controller 5 in some examples may control the illuminance (brightness), color, and the like of the lighting. The air conditioner controller 6 controls the on and off of heating operation, cooling operation, dehumidification operation, and the like of an air conditioner installed in or for the room. The air conditioner controller 6 may also control the heating rates, the cooling rates, and the dehumidifying rates based on the measured room temperature, the setpoint temperature, the measured humidity level, and the like when the air conditioner is turned on. The lighting controller 5 and the air conditioner controller 6 are connected to the network 4.

The server 2 connects to the plurality of MFPs 1 provided in each of the rooms A and B, as well as the lighting controllers and the air conditioner controllers 6 by the network 4. The server 2 collects data output from the MFPs 1 installed in the rooms A and B by room. Then, the server 2 monitors each of the rooms A and B based on the collected data and provides a service of controlling the lighting controller 5 and the air conditioner controller 6 in each room according to the monitored situation. The light controller 5 and the air conditioner controller 6 may each be referred to as a control target in this context.

The server 2 is installed together with a monitoring device 7 in, for example, an office management center (e.g., a server room, control room, or control station). The monitoring device 7 is connected to the network 4. The monitoring device 7 includes a display device for displaying a monitoring image and an input device for receiving an operation input based on the monitoring image. The installation location of the server 2 and the monitoring device 7 is not limited to an office management center. For example, the monitoring device 7 may be installed in the management center, but the server 2 may be installed in a place other than the management center. The monitoring device 7 may be installed in a place in the same place (room) in which an MFP 1 is installed. The server 2 may be a cloud server for cloud computing connected across the Internet or the like.

Figure 2:
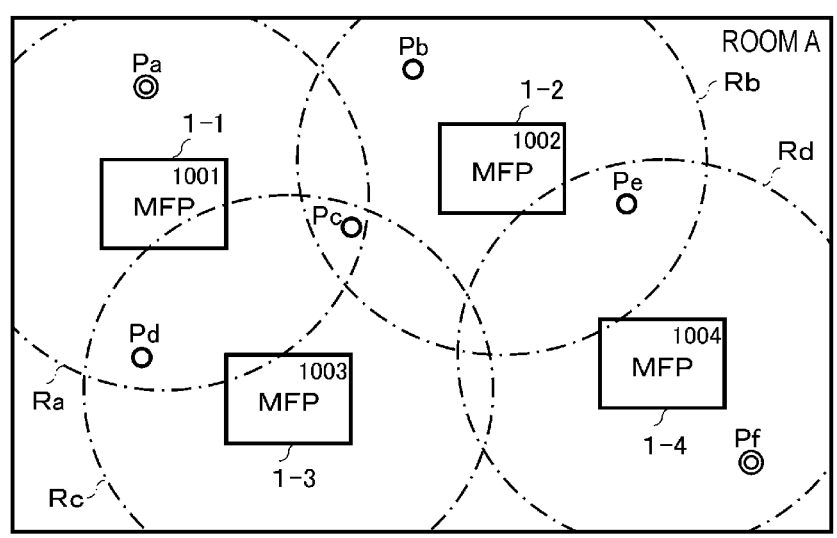
FIG. 2 is a schematic diagram illustrating a layout example of MFPs installed in a room.

FIG. 2 is a schematic diagram illustrating a layout example of the MFPs 1 installed in the room A. FIG. 2 illustrates a layout example in which four MFPs 1 (MFP 1-1, MFP 1-2, MFP 1-3, and MFP 1-4) are in the room A. The MFP 1-1, the MFP 1-2, the MFP 1-3, and the MFP 1-4 can have substantially the same configuration as one another. However, different IDs (MFPIDs) are set for each of the MFP 1-1, the MFP 1-2, the MFP 1-3, and the MFP 1-4. In FIG. 2, the four-digit numeric strings respectively associated with the MFP 1-1, the MFP 1-2, the MFP 1-3, and the MFP 1-4 are examples of an MFPID. That is, "1001" is the MFPID of the MFP 1-1, "1002" is the MFPID of the MFP 1-2, "1003" is the MFPID of the MFP 1-3, and "1004" is the MFPID of the MFP 1-4. The MFPID is device identification information for individually identifying the MFP 1-1, the MFP 1-2, the MFP 1-3, and the MFP 1-4. Needless to say, the MFPID is not limited to the four-digit numeric string.

In FIG. 2, a region Ra having a generally circular shape and centered on the MFP 1-1 shows the connectable range of wireless communication using Bluetooth of the MFP 1-1. Similarly, a region Rb shows a connectable range of the MFP 1-2, a region Rc shows the connectable range of the MFP 1-3, and a region Rd shows the connectable range of the MFP 1-4. The connectable ranges of the MFP 1-1, MFP 1-2, MFP 1-3, and MFP 1-4 cover almost the entire area of the room A with at least a partial overlap in spots. In FIG. 2, reference symbols Pa to Pf correspond to Bluetooth-enabled wireless devices, as will be further described below.

The room B is likewise arranged similarly to the room A, with a plurality of MFPs 1 being arranged in the room B so that the connectable ranges of such MFPs 1 using each Bluetooth partially overlapping at least in certain regions of room B.

Figure 3:
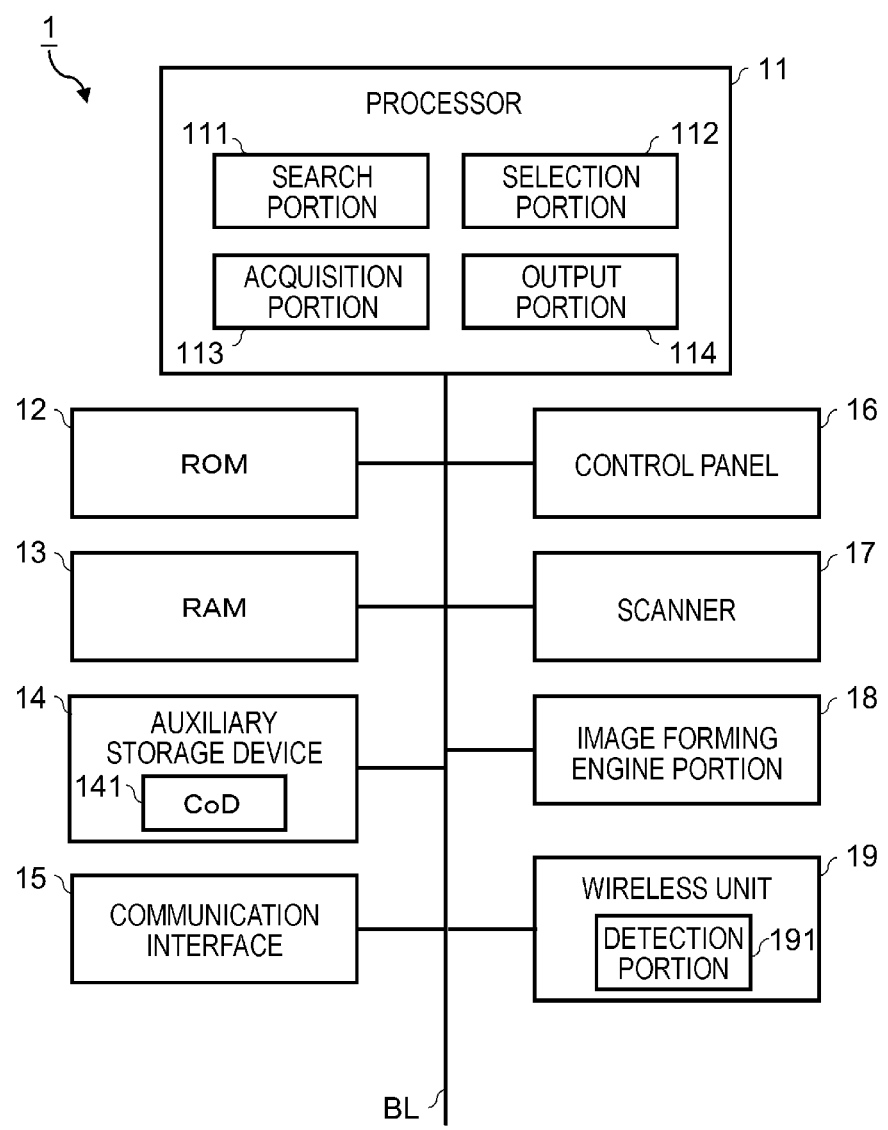
FIG. 3 is a block diagram of a MFP.

FIG. 3 is a block diagram illustrating of the MFPs 1. Each MFP 1 includes a processor 11, a read only memory (ROM) 12, a random access memory (RAM) 13, an auxiliary storage device 14, a communication interface 15, a control panel 16, a scanner 17, an image forming engine portion 18, a wireless unit 19, and the like. The processor 11, the ROM 12, the RAM 13, the auxiliary storage device 14, the communication interface 15, the control panel 16, the scanner 17, the image forming engine portion 18, and the wireless unit 19 are connected to a bus line BL. The bus line BL includes an address bus, a data bus, and the like.

The processor 11 controls each part of the MFP 1 in order to realize various functions of the MFP 1 according to an operating system and/or application programs. The processor 11 is, for example, a central processing unit (CPU).

The ROM 12 and the RAM 13 function as a main memory of the processor 11. The ROM 12 is a non-volatile memory area. The ROM 12 may store the operating system and/or the application programs. The ROM 12 may also store data necessary for the processor 11 to execute a process for controlling a part of the MFP 1. The RAM 13 is a volatile memory area. The RAM 13 can be used as an image memory for storing image data (e.g., print data or the like). The RAM 13 is also used as a work area in which data can be appropriately rewritten by the processor 11.

As the auxiliary storage device 14, for example, a well-known storage device such as an electric erasable programmable read-only memory (EEPROM), a hard disc drive (HDD) or a solid-state drive (SSD) can be used alone or in combinations of two or more. The auxiliary storage device 14 stores data used by the processor 11 for performing various processes and data generated by the processor 11. The auxiliary storage device 14 may store application programs.

The communication interface 15 connects to the network 4. The MFP 1 performs data communication with the server 2 via the communication interface 15.

The control panel 16 includes a display device and an input device. The display device is a liquid crystal display, an organic electro luminescence (EL) display, or the like. The display device displays various information about the MFP 1. The input device can be a device in which a plurality of keys or buttons are arranged. The input device receives the input from a user and outputs a signal corresponding to the input. The input device may be a touch panel integrated with the display device.

The scanner 17 is a device which reads an image of a document placed on a glass surface of a platen and converts the image as read into image data. The scanner 17 can be used for a copy function, a facsimile function, or the like of the MFP 1.

The image forming engine portion 18 has a charging portion, an exposure portion, a developing portion, a transfer portion, and a fixing portion. The charging portion charges a surface of a photoconductor. The exposure portion selectively exposes the charged surface of the photoconductor to form a latent image. The developing portion develops the latent image on the surface of the photoconductor with toner. The transfer portion transfers a toner image on the surface of the photoconductor to a print medium. The fixing portion fixes the transferred toner image to the print medium.

The wireless unit 19 controls wireless communication using Bluetooth or the like as a communication standard. The wireless unit 19 may also be referred to as a Bluetooth unit or the like. The wireless unit 19 is an example of a communication unit which performs wireless communication with a wireless device 3 by using a predetermined wireless communication standard. The wireless unit 19 includes a detection portion 191 which detects the received signal strength indicator (RSSI) of a radio wave output from a wireless device 3. In the following, the received signal strength indicator (RSSI) of the radio wave is also referred to as a radio wave reception intensity.

The MFP 1 uses a part of the storage area of the auxiliary storage device 14 as a class code area 141. The class code area 141 stores a Bluetooth setting parameter called a class of device (CoD). The CoD value is a parameter indicating what type of device the wireless device 3 is. As described above, the wireless device 3 which uses Bluetooth may be a personal computer, a tablet terminal, a smartphone, or the like. In addition, various other types of devices such as a mouse, a keyboard, a speaker, a headset, or an audio receiver use Bluetooth. The CoD is a common value set for the wireless devices 3 of the same type. For example, smartphones share the same CoD value. The CoD of any Bluetooth-compatible wireless device 3 is stored in the class code area 141. The CoD stored in the class code area 141 is not necessarily limited to one type. Two or more types of CoD may be stored in the class code area 141.

In the MFP 1 having such a configuration, the processor 11 provides functions of a search portion 111, a selection portion 112, an acquisition portion 113, and an output portion 114. The search portion 111 is the function of periodically searching for the wireless devices 3 connected via the wireless unit 19.

The selection portion 112 provides a function of selecting a specific wireless device from the wireless devices 3 detected by the search of the search portion 111. Specifically, the selection portion 112 selects a wireless device 3 for which the CoD stored in the class code area 141 is set as a specific wireless device type. In the following, for convenience of explanation, those wireless devices 3 of the specific wireless device type will be referred to as a "wireless device 30".

The acquisition portion 113 provides a function of acquiring unique identification information from the wireless device 30 selected by the selection portion 112. The Bluetooth-compatible wireless device 3 which performs wireless communication using Bluetooth has Bluetooth-related information related to the particular wireless device 3, for example, a Bluetooth name and a Bluetooth address in addition to the CoD value as parameters used for a wireless connection using Bluetooth as a communication standard. Among such Bluetooth-related information, the Bluetooth address is a unique address used to individually identify the Bluetooth-compatible wireless device 3. That is, the Bluetooth address can be considered unique identification information of a wireless device 30.

The output portion 114 provides a function of outputting the identification information (that is, the data including the Bluetooth address) acquired by the acquisition portion 113 to the server 2.

The functions of the search portion 111, the selection portion 112, the acquisition portion 113, and the output portion 114 are all realized by a "first information process" executed by the processor 11 according to a control program. Aspects of this first information process will be described below. The control program can be a kind of application program stored in the ROM 12 or the auxiliary storage device 14. The method for installing the control program in the ROM 12 or the auxiliary storage device 14 is not particularly limited. Such a program can be recorded on a removable recording medium or distributed via the network 4, in such a manner that the program can be installed in the ROM 12 or the auxiliary storage device 14. The recording medium may be in any form such as a CD-ROM or a memory card as long as the recording medium can store a program and can be read by a device.

Figure 4:
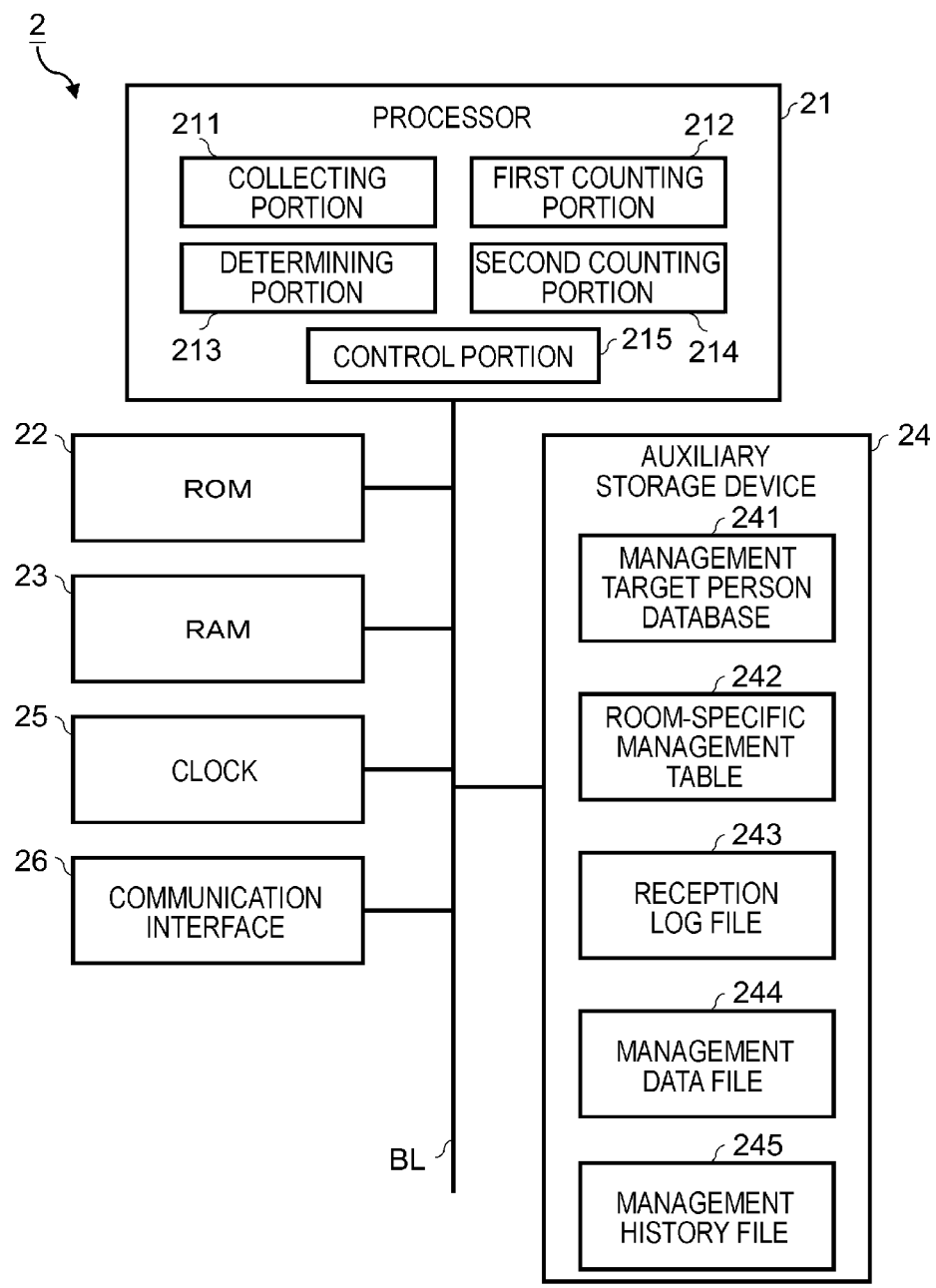
FIG. 4 is a block diagram of a server.

FIG. 4 is a block diagram of the server 2. The server 2 includes a processor 21, a ROM 22, a RAM 23, an auxiliary storage device 24, a clock 25, a communication interface 26, and the like. The processor 21, the ROM 22, the RAM 23, the auxiliary storage device 24, the clock 25, and the communication interface 26 are connected to a bus line BL. The bus line BL includes an address bus, a data bus, and the like. The server 2 forms a computer by connecting the processor 21 with the ROM 22, the RAM 23, the auxiliary storage device 24, the clock 25, and the communication interface 26 with the bus line BL.

The processor 21 controls components of the server 2 in order to realize various functions according to an operating system or application programs. The processor 21 is, for example, a CPU.

The ROM 22 and the RAM 23 function as a main memory of the processor 21. The ROM 22 is a non-volatile memory area. The ROM 22 stores the operating system and/or the application programs. The ROM 22 may store data necessary for the processor 21 to execute a process for controlling each sub-component or the like. The RAM 23 is a volatile memory area. The RAM 23 is used as a work area where data is appropriately rewritten by the processor 21.

The auxiliary storage device 24 functions as an auxiliary storage device of the processor 21. As the auxiliary storage device 24, for example, a well-known storage device such as an EEPROM, an HDD, or a solid-state drive (SSD) may be used alone or in combination. The auxiliary storage device 24 stores data used by the processor 21 for performing various processes and data generated by the processes of the processor 21. The auxiliary storage device 24 may store application programs.

The clock 25 tracks the date and time. The processor 21 uses the date and time tracked by the clock 25 as the current date and time.

The communication interface 26 connects to the network 4. The server 2 performs data communication with the MFPs 1 of the rooms A and B, the lighting controller 5, the air conditioner controller 6, and the monitoring device 7 via the communication interface 26.

The server 2 uses a part of the storage area of the auxiliary storage device 24 as a management target person database 241, a room-specific management table 242, a reception log file 243, a management data file 244, and a management history file 245.

The management target person database 241 is a collection of target person records 2411 (see FIG. 5) generated for each management target person. In the present embodiment, a user who uses the room A or the room B is a management target person. For example, if the rooms A and B are working rooms of an office, conference rooms, drawing rooms, or the likes, a management target person can be a manager, an employee, or the like of the company that controls the office. For example, if the rooms A and B are classrooms, the management target person may be a teacher, a lecturer, a child, a student, a college student, an enrollee, or the like. A unique target person ID is assigned to each management target person.

FIG. 5 is a schematic diagram illustrating the configuration of a target person record 2411. As shown in the figure, the target person record 2411 includes information such as the target person ID, a name, a communication address, and an attribute. The name field is for a name of the management target person to which the target person ID in the corresponding target person ID field is assigned. The communication address field is for a Bluetooth address of a smartphone (or the like) owned by the management target person. The attribute field is for an attribute value related to the management target person. There may be multiple attribute fields or attribute values in one attribute field. Information about, for example, gender, age, grade, affiliation, occupation, and job title can be provided in the attribute field(s) or as attributes values.

The room-specific management table 242 comprises a data table formed separately for each of the rooms A and B.

FIG. 6 is a configuration example of the room-specific management table 242 for the room A illustrated in FIG. 2. Since the room-specific management table 242 for the room B has substantially the same configuration, additional description thereof is omitted here.

The room-specific management table 242 includes an area 2421 of a room name, and columns 2422, 2423, 2424, 2425, 2426, and 2427 respectively for the MFPID, the number of target persons, the number of non-target persons, the total number of persons, the air conditioner control information, and the lighting control information. Each of the columns 2422, 2423, and 2424 is divided into rows corresponding to the different MFPID values. For example, since four MFP 1-1, MFP 1-2, MFP 1-3, and MFP 1-4 are installed in the room A, as illustrated in FIG. 2, there are four rows. The columns 2425, 2426, and 2427 have values that are set on a per room basis, thus have only one row (or value) in each column regardless of the number of MFPs 1 in the room.

The MFPIDs of the MFP 1-1, the MFP 1-2, the MFP 1-3, and the MFP 1-4 are listed in column 2422. The number of management target persons carrying specific wireless devices 30 within the respective connectable ranges Ra, Rb, Rc, and Rd for the corresponding MFP 1-1, MFP 1-2, MFP 1-3, and MFP 1-4 are listed in column 2422. The number of non-management target persons carrying specific wireless devices 30 within the respective connectable ranges Ra, Rb, Rc, and Rd for the corresponding MFP 1-1, MFP 1-2, MFP 1-3, and MFP 1-4 are listed in column 2424. In this context, a "non-management target person" is a person without a corresponding record 2411 in the management target person database 241. The "non-management target person" may be referred to as an "unknown person" or an "unregistered person" in some contexts. The value in column 2425 summed total number of detected management target persons and non-management target persons carrying specific wireless devices 30 within the room A. The value in column 2426 relates to information indicating the capacity (heating capacity, cooling capacity, or dehumidification capacity) of the air conditioner installed for the room A. The value in column 2427 is information indicating whether the lighting (more particularly, a lighting fixture) is on or off in the room A.

Figure 7:
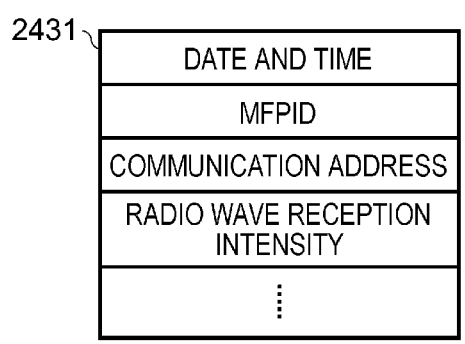
FIG. 7 is a schematic diagram illustrating a configuration of reception log data.
Figure 8:
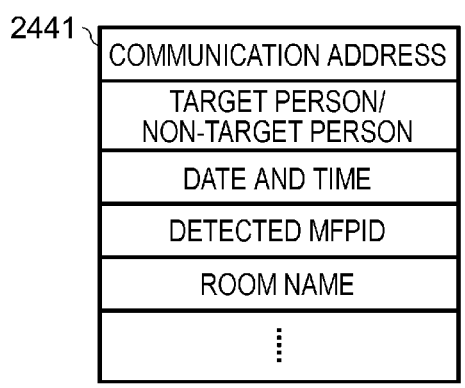
FIG. 8 is a schematic diagram illustrating a configuration of management data.

The reception log file 243 is a data file which collects and stores reception log data 2431 (see FIG. 7) as received. FIG. 7 is a schematic diagram illustrating a configuration of the reception log data 2431. As illustrated, the reception log data 2431 includes items such as a date and time, a MFPID, a communication address, and a radio wave reception intensity. The management data file 244 is a data file for collecting and storing the variously received management data 2441 (see FIG. 8). FIG. 8 is a schematic diagram illustrating a configuration of the management data 2441. As illustrated, the management data 2441 includes items such as a communication address, a target person and non-target person identification flag, a date and time, a detected MFPID, and a room name.

In the server 2, the processor 21 has functions of a collecting portion 211, a first counting portion 212, a determining portion 213, a second counting portion 214, and a control portion 215. The collecting portion 211 provides a function of collecting data output by the output portion 114 of the MFP 1 (an office device). The first counting portion 212 provides a function of counting the number of specific wireless devices 30 existing within the connectable range of wireless communication using Bluetooth for the MFP 1 based on the data collected in the collecting portion 211.

The determining portion 213 provides a function of determining whether a specific wireless device 30 is a management target based on the identification information included in the data (more particular, a Bluetooth address) collected by the collecting portion 211. In the present embodiment, a wireless device 30 with a Bluetooth address described in a target person record 2411 stored in the management target person database 241 is considered a management target. To put it the other way around, a wireless device 30 for which the Bluetooth address is not described in a target person record 2411 is considered a non-management target.

The second counting portion 214 provides a function of counting the number of wireless devices 30 determined as a management target and the number of wireless devices 30 determined as a non-management target by the determining portion 213. The control portion 215 provides a function of controlling the lighting controller 5 and the air conditioner controller 6 based on the total number of wireless devices 30 counted by the first counting portion 212.

The functions of the collecting portion 211, the first counting portion 212, the determining portion 213, the second counting portion 214, and the control portion 215 are all realized by a "second information process" executed by the processor 21 according to a control program. The second information process will be described below. The control program can be a kind of application program stored in the ROM 22 or the auxiliary storage device 24. The method for installing the control program in the ROM 22 or the auxiliary storage device 24 is not particularly limited. The program can be recorded on a removable recording medium or distributed via the network 4. The recording medium may be in any form such as a CD-ROM or a memory card.

Operation of Office Device System

Next, the operation of the office device system 100 will be described with reference to FIGS. 9 to 12. The operation described below is one example. If the same effect can be obtained, the order or the content of the process can be changed as appropriate.

Figure 9:
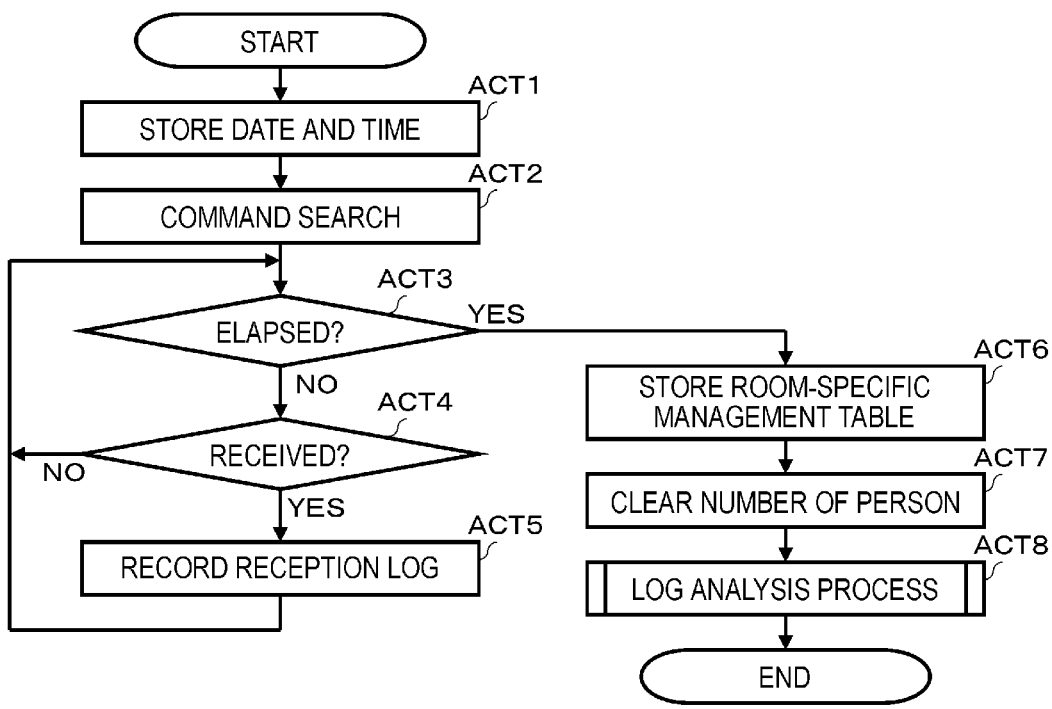
FIG. 9 is a flowchart an information process executed by a processor of a server according to a control program.
Figure 10:
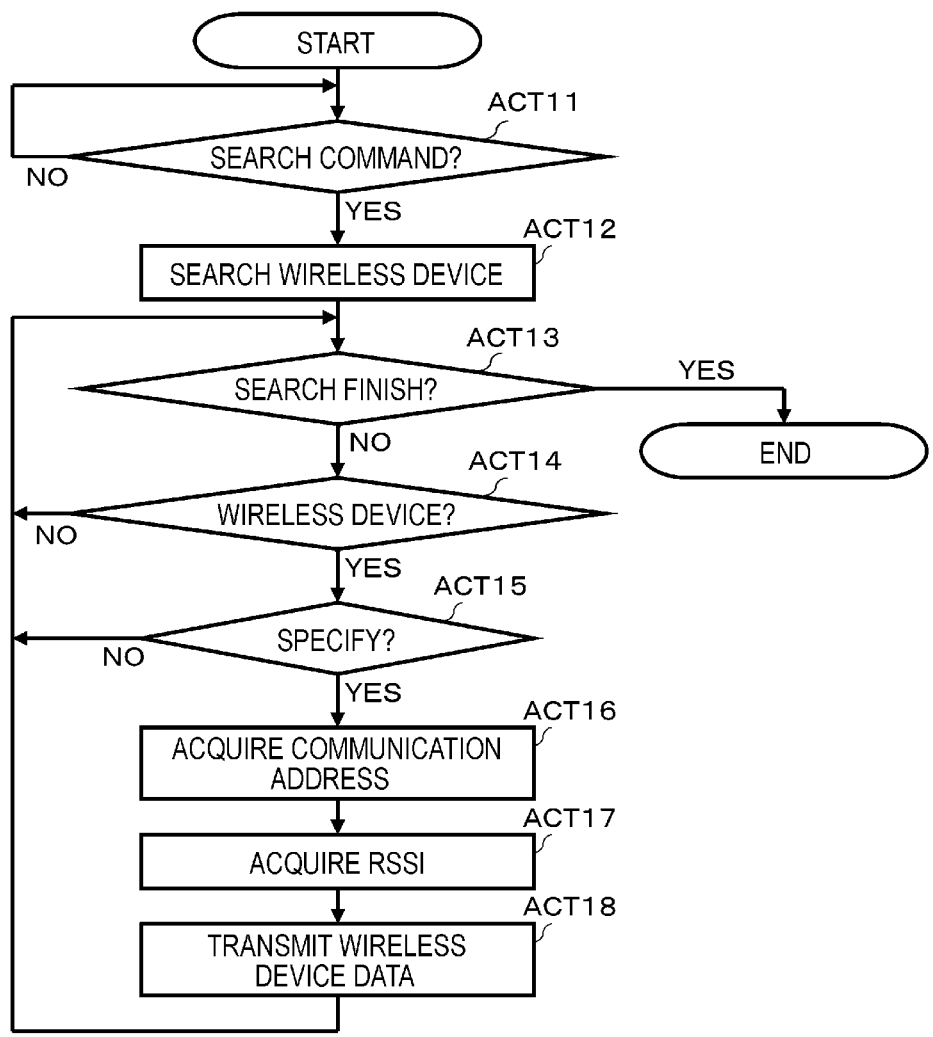
FIG. 10 is a flowchart of an information process executed by a processor of a MFP according to a control program.

FIG. 9 is a flowchart of a second information process executed by the processor 21 of the server 2 according to a control program. FIG. 10 is a flowchart of a first information process executed by the processor 11 of an MFP 1 according to a control program.

The processor 21 repeatedly executes the second information process shown in the flowchart of FIG. 9 at a preset cycle rate. The preset cycle rate is, for example, a one minute interval.

First, the processor 21 stores the date and time tracked by the clock 25 as ACT 1 in the work memory of the RAM 23. Hereinafter, this date and time will be referred to as a monitoring date and time. The processor 21 controls the communication interface 26 so as to output a search command as ACT 2. By this control, a search command is transmitted from the server 2 to the MFPs 1 of each of the rooms A and B through the network 4.

As illustrated in FIG. 10, the processor 11 of each MFP 1 is waiting for the search command as ACT 11. Upon receiving the search command via the communication interface 15, the processor 11 determines YES in ACT 11 and proceeds to ACT 12. The processor 11 controls the wireless unit 19 as ACT 12 to search for a Bluetooth-compatible wireless device 3 located in the vicinity (communication range) of the MFP 1. The time required for the search, the so-called search time, is, for example, ten seconds. By this search, the wireless unit 19 communicates with the Bluetooth-compatible wireless devices 3 present within the connectable range of the MFP 1 using Bluetooth. By this communication, the wireless unit 19 acquires parameters such as the Bluetooth name, the Bluetooth address, and the CoD from the wireless devices 3.

The processor 11 confirms whether the search for the wireless device 3 is finished as ACT 13. If a certain period of time (the set search time) has not elapsed, the search is not yet finished, and the processor 11 determines NO in ACT 13 and proceeds to ACT 14. The processor 11 checks whether the wireless unit 19 communicates with a wireless device 3 as ACT 14. If no communication with a wireless device 3 is performed, the processor 11 determines NO in ACT 14 and returns to ACT 13.

If the wireless unit 19 communicates with a wireless device 3, the processor 11 determines YES in ACT 14 and proceeds to ACT 15. The processor 11 confirms whether the wireless device 3 which communicates with the wireless unit 19 is a specific wireless device 30 as ACT 15. That is, the processor 11 checks whether the CoD set in the wireless device 3 now being communicated with matches a CoD stored in the class code area 141. If CoDs do not match, the wireless device 3 is not a specific wireless device 30. The processor 11 determines NO in ACT 15, and returns to ACT 13.

If CoDs match, the wireless device 3 is a specific wireless device 30. The processor 11 determines YES in ACT 15, and proceeds to ACT 16. The processor 11 acquires a communication address, that is, a Bluetooth address from the communication result with the specific wireless device 30 as ACT 16. Further, as ACT 17, the processor 11 acquires the radio wave reception intensity as detected by the detection portion 191 if wireless communication with the wireless device 30 was performed. Then, the processor 11 controls the communication interface 15 so as to transmit the wireless device data as ACT 18. By this control, the wireless device data is transmitted from the MFP 1 to the server 2 through the network 4. The wireless device data includes at least the MFPID of the MFP 1, the communication address (Bluetooth address) acquired in the process of ACT 16, and the radio wave reception intensity acquired in the process of ACT 17. The processor 11 then returns to ACT 13. The processor 11 repeatedly executes the processes of ACT 14 to ACT 18 until the search time of the wireless device 3 is finished.

In this way, the processor 11 of each MFP 1 searches for wireless devices 3. Then, if a Bluetooth compatible wireless device 3 is detected, the processor 11 confirms whether the wireless device 3 is a specific wireless device 30 by comparison of CoD values. If the wireless device 3 is a specific wireless device 30, the processor 11 transmits the wireless device data related to the wireless device 30 to the server 2. The processor 11 executes the above process until the search time elapses. Once the search time elapses, the processor 11 determines YES in ACT 13, and ends the first information process of the flowchart of FIG. 10.

Here, the processor 11 realizes the function of the search portion 111 by executing the process of ACT 12 in cooperation with the wireless unit 19. The processor 11 realizes the function of the selection portion 112 by executing the processes of ACT 14 and ACT 15. The processor 11 realizes the function of the acquisition portion 113 by executing the process of ACT 16. The processor 11 realizes the function of the output portion 114 by executing the process of ACT 18.

With these functions, each MFP 1 can identify a specific wireless device 30 (a wireless device 3 having the CoD stored in the class code area 141 as a Bluetooth setting parameter) from among all the wireless devices 3 within the connectable range of the MFP 1. For example, if the CoD of the smartphone is set in the class code area 141, each MFP 1 can identify smartphones within the connectable range of the corresponding MFP 1. Then, from each MFP 1, wireless device data including the Bluetooth address of the smartphone and the radio wave reception intensity is transmitted to the server 2 through the network 4. Similarly, for example, if the CoD of a tablet terminal is set in the class code area 141, each MFP 1 can identify a tablet terminal within the connectable range of the MFP 1. Then, from each MFP 1, wireless device data including the Bluetooth address of the tablet terminal and the radio wave reception intensity is transmitted to the server 2 through the network 4.

Returning to the description of FIG. 9.

The processor 21 which output the search command confirms whether the search time for the MFP 1 has elapsed as ACT 3. If the search time has not elapsed, the processor 21 determines NO in ACT 3 and proceeds to ACT 4. The processor 21 confirms whether wireless device data has been received as ACT 4. If wireless device data is not received, the processor 21 determines NO in ACT 4 and returns to ACT 3.

If the wireless device data has been received from any of the MFPs 1 through the network 4, the processor 21 determines YES in ACT 4 and proceeds to ACT 5. The processor 21 records the reception log of the wireless device data as ACT 5. That is, the processor 21 generates the reception log data 2431 including the monitoring date and time stored in ACT 1, and the MFPID, the communication address, and the radio wave reception intensity which are acquired from the received wireless device data. Then, the processor 21 records the reception log data 2431 in the reception log file 243. After that, the processor 21 returns to ACT 3.

As described above, each time the processor 21 of the server 2 receives wireless device data from an MFP 1, the processor 21 generates the reception log data 2431 based on the received wireless device data, and repeats the process of recording the reception log data 2431 in the reception log file 243.

Here, the processor 21 realizes the function of the collecting portion 211 by executing the processes of ACT 2 to ACT 5.

After the search time elapses, the processor 21 determines YES in ACT 3 and proceeds to ACT 6. The processor 21 stores the room-specific management table 242 in the management history file 245 as ACT 6. In the room-specific management table 242, the data obtained in the preceding second information process is described. Therefore, in the management history file 245, the room-specific management table 242 in which the data obtained in the second information processes executed at each monitoring date and time is stored in chronological order.

The processor 21 clears the data related to the number of persons in the room-specific management table 242, that is, all the data of the column 2423, the column 2424, and the column 2425 is reset to "0" as ACT 7. Then, the processor 21 executes a log analysis process as ACT 8.

Figure 11:
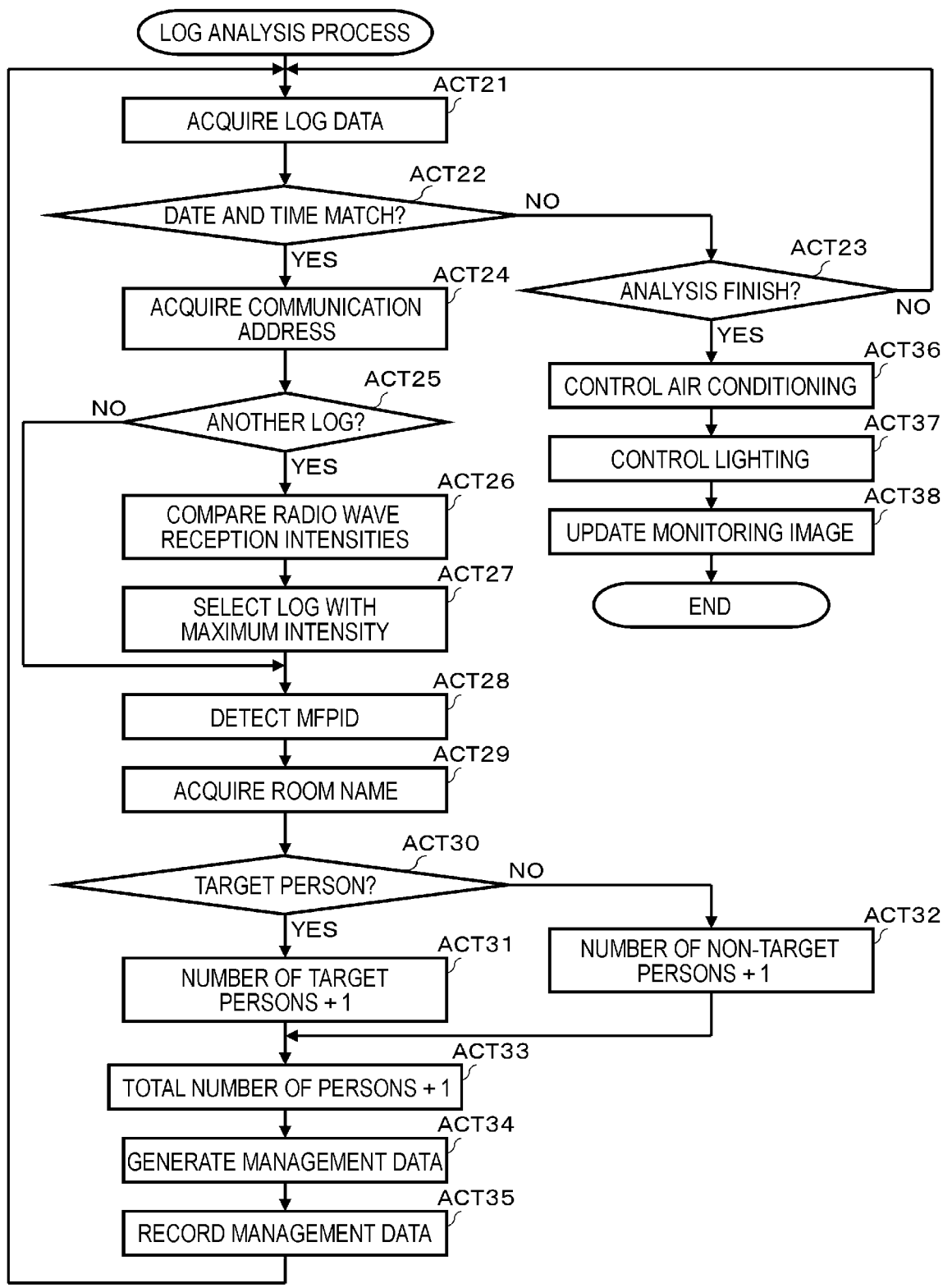
FIG. 11 is a flowchart of a log analysis process.

FIG. 11 is a flowchart specifically illustrating a log analysis process. Upon entering the log analysis process, the processor 21 acquires the reception log data 2431 from the reception log file 243 as ACT 21. Then, the processor 21 confirms whether the monitoring date and time of the reception log data 2431 matches the monitoring date and time stored in the work memory in ACT 1. If the reception log data having a different monitoring date and time is acquired, the processor 21 determines NO in ACT 22 and proceeds to ACT 23. The processor 21 confirms whether the analysis of the reception log data 2431 is finished as ACT 23.

If reception log data that is not yet acquired is recorded in the reception log file 243, analysis of the reception log data 2431 is not finished. The processor 21 determines NO in ACT 23 and returns to ACT 21. The processor 21 acquires next reception log data 2431 from the reception log file 243. Then, the processor 21 confirms whether the monitoring date and time of the reception log data 2431 matches the monitoring date and time stored in the work memory.

In this way, the processor 21 of the server 2 searches the reception log file 243 to find the reception log data 2431 matching the monitoring date and time stored in the work memory. In the following, the reception log data 2431 matching the monitoring date and time will be referred to as a first reception log data 2431-1.

If the first reception log data 2431-1 is detected, the processor 21 determines YES in ACT 22 and proceeds to ACT 24. The processor 21 acquires a communication address (Bluetooth address) from the first reception log data 2431-1 as ACT 24.

The processor 21 further searches the reception log file 243 as ACT 25 to confirm whether another reception log data 2431 with the same monitoring date and time and communication address as the first reception log data 2431-1 but a different MFPID is recorded. In the following, this other reception log data 2431 will be referred to as a second reception log data 2431-2. If a specific wireless device 30 exists in an area where the connectable ranges of two or more MFPs 1 overlap, the second reception log data 2431-2 is recorded in the reception log file 243. If the second reception log data 2431-2 is not recorded, the processor 21 determines NO in ACT 25 and proceeds to ACT 28.

If the second reception log data 2431-2 is recorded, the processor 21 determines YES in ACT 25 and proceeds to ACT 26. The processor 21 compares the radio wave reception intensity of the first reception log data 2431-1 with the radio wave reception intensity of the second reception log data 2431-2 as ACT 26. Incidentally, if the specific wireless device 30 exists in an area where the connectable ranges of three or more MFPs 1 overlap, a plurality of second reception log data 2431-2 are recorded in the reception log file 243. In that case, the processor 21 compares the radio wave reception intensities of the reception log data 2431.

Generally, the radio wave reception intensity increases as a relative distance between the wireless device 30 which is a radio wave transmission source and the MFP 1 which is a radio wave reception source gets shorter. The processor 21 selects reception log data 2431 having the greatest radio wave reception intensity as ACT 27. Then, the processor 21 proceeds to ACT 28.

If the second reception log data 2431-2 does not exist, the first reception log data 2431-1 becomes the processing target data after ACT 28. If the second reception log data 2431-2 exists, the reception log data 2431 having the greatest radio wave reception intensity becomes the processing target data after ACT 28. In the following, the particular reception log data 2431 to be processed will be referred to as a third reception log data 2431-3.

The processor 21 detects the MFPID in the third reception log data 2431-3 as ACT 28. Then, the processor 21 acquires the room name described in the area 2421 from the room-specific management table 242 in which the MFPID is described in the column 2422 as ACT 29. In the following, the room-specific management table 242 in which the MFPID is described in the column 2422 will be referred to as a target room-specific management table 242-1.

The processor 21 confirms whether the communication address included in the third reception log data 2431-3 is registered in the management target person database 241 as ACT 30. If the communication address is registered in the management target person database 241, the processor 21 determines YES in ACT 30 and proceeds to ACT 31. The processor 21 increases the number of target persons corresponding to the MFPID by "1" in the column 2423 of the target room-specific management table 242-1 as ACT 31. If the communication address is not registered in the management target person database 241, the processor 21 determines NO in ACT 30 and proceeds to ACT 32. The processor 21 increases the number of non-target persons corresponding to the MFPID by "1" in the column 2424 of the target room-specific management table 242-1 as ACT 32.

After finishing the processes of ACT 31 or ACT 32, the processor 21 proceeds to ACT 33. The processor 21 increases the total number of persons described in the column 2425 of the target room-specific management table 242-1 by "1" as ACT 33. Further, the processor 21 generates management data 2441 as ACT 34. The management data 2441 includes items such as a communication address, a target person and non-target person identification flag, a date and time, a detected MFPID, and a room name. The communication address is a communication address included in the third reception log data 2431-3. The target person and non-target person identification flag is a value indicating a target person, for example, "1" if the communication address is registered in the management target person database 241. The target person and non-target person identification flag indicates whether the wireless device 30 is carried by a non-target person or a target person (for example, a "0" flag value if the communication address is not registered in the management target person database 241 and "1" if otherwise). The date and time is a monitoring date and time. The detected MFPID is an MFPID included in the third reception log data 2431-3. The room name is a room name obtained from the room-specific management table 242 in the process of ACT 29.

The processor 21 records the management data 2441 in the management data file 244 as ACT 35. After that, the processor 21 returns to ACT 21. The processor 21 executes the process after ACT 21 in the same manner as described above until the analysis of the reception log data 2431 is finished.

In this way, based on the reception log data 2431 recorded in the reception log file 243 in the second information process of this cycle, the server 2 determines in which room the specific wireless device 30 is present, within connectable range of which MFP 1 the specific wireless device 30 is located, and whether or not the person carrying the wireless device 30 is a target person. Then, the server 2 counts the total number of target persons and the total number of non-target persons correlated with the MFPID of the corresponding MFP 1 in the room-specific management table 242 of the corresponding room. Further, the server 2 sums the total numbers of target persons and non-target persons.

Here, the processor 21 realizes the function of the first counting portion 212 by processing ACT 33. The processor 21 realizes the function of the determining portion 213 by processing ACT 30. The processor 21 realizes the function of the second counting portion 214 by processing ACT 31 and ACT 32.

With these functions, for example, in the column 2425 of the room-specific management table 242 corresponding to the room A, the server 2 can count the number of specific wireless devices 30 existing within the connectable ranges Ra, Rb, Rc, and Rd of wireless communication using Bluetooth of the four MFP 1-1, MFP 1-2, MFP 1-3, and MFP 1-4 installed in the room A.

In FIG. 2, reference symbols Pa to Pf are assumed to indicate the positions of specific wireless devices 30. Specifically, the reference symbols Pa and Pf indicate the positions of the wireless devices 30 carried by non-target persons, and the reference symbols Pb, Pc, Pd, and Pe indicate the positions of the wireless devices 30 carried by target persons.

In this case, since the wireless device 30 of the reference symbol Pa exists within the connectable range Ra of the MFP 1-1, the management data 2441 having the detected MFPID of "1001" is recorded in the management history file 245. Further, the value of the column 2424 and the value of the column 2425 corresponding to the MFPID "1001" of the room-specific management table 242 of the room A are respectively added by "1".

Since the wireless device 30 of the reference symbol Pb exists within the connectable range Rb of the MFP 1-2, the management data 2441 having the detected MFPID of "1002" is recorded in the management history file 245. Further, the value of the column 2423 and the value of the column 2425 corresponding to the MFPID "1002" of the room-specific management table 242 of the room A are respectively added by "1".

Since the wireless device 30 of the reference symbol Pf exists within the connectable range Rd of the MFP 1-4, the management data 2441 having the detected MFPID of "1004" is recorded in the management history file 245. Further, the value of the column 2424 and the value of the column 2425 corresponding to the MFPID "1004" of the room-specific management table 242 of the room A are respectively added by "1".

The wireless device 30 of the reference symbol Pc exists within a range where the connectable range Ra of the MFP 1-1, the connectable range Rb of the MFP 1-2, and the connectable range Rc of the MFP 1-3 overlap. Here, assuming that the radio wave reception intensity detected in the wireless unit 19 of the MFP 1-2 is the highest, the management data 2441 having the detected MFPID of "1002" is recorded in the management history file 245. Further, the value of the column 2423 and the value of the column 2425 corresponding to the MFPID "1002" of the room-specific management table 242 of the room A are respectively added by "1".

The wireless device 30 of the reference symbol Pd exists within a range where the connectable range Ra of the MFP 1-1 and the connectable range Rc of the MFP 1-3 overlap. Here, assuming that the radio wave reception intensity detected in the wireless unit 19 of the MFP 1-3 is the highest, the management data 2441 having the detected MFPID of "1003" is recorded in the management history file 245. Further, the value of the column 2423 and the value of the column 2425 corresponding to the MFPID "1003" of the room-specific management table 242 of the room A are respectively added by "1".

The wireless device 30 of the reference symbol Pe exists within a range where the connectable range Rb of the MFP 1-2 and the connectable range Rd of the MFP 1-4 overlap. Here, assuming that the radio wave reception intensity detected in the wireless unit 19 of the MFP 1-2 is the highest, the management data 2441 having the detected MFPID of "1002" is recorded in the management history file 245. Further, the value of the column 2423 and the value of the column 2425 corresponding to the MFPID "1002" of the room-specific management table 242 of the room A are respectively added by "1".

Thus, the values of columns 2423, 2424, and 2425 in the room-specific management table 242 of the room A are as illustrated in FIG. 6. Here, the value "6" of the column 2425 is the number of specific wireless devices 30 existing within the connectable ranges Ra, Rb, Rc, and Rd of the four MFP 1-1, MFP 1-2, MFP 1-3, and MFP 1-4 installed in the room A. The connectable ranges Ra, Rb, Rc, and Rd cover almost the entire area of the room A. Therefore, if a wireless device 3 such as a smartphone or tablet terminal carried by a user is the specific wireless device 30, the value "6" of the column 2425 can be said to be the number of carriers with the specific wireless devices in the room A. Also, for example, it can be said that the value "0" of the column 2423 and the value "1" of the column 2424 corresponding to the MFPID "1001" are the numbers of target persons and non-target persons existing within the connectable range Ra of the MFP 1-1. The same applies to the values of columns 2423 and 2424 corresponding to other MFPIDs.

Returning to the description of FIG. 11.

When the analysis of the reception log data 2431 is finished, the processor 21 determines YES in ACT 23 and proceeds to ACT 36. The processor 21 performs air conditioning control as ACT 36. For example, the processor 21 confirms whether the value of the column 2425 in the room-specific management table 242 of the room A is smaller than a first threshold value. The first threshold value can be any value that is a boundary condition as to whether it is considered to be necessary to adjust the capacity of the air conditioner.

As described above, the value of the column 2425 is the number of carriers with the specific wireless devices in the room A. By adjusting the capacity of the air conditioner according to the estimated number of persons present in the room, it is possible to operate the air conditioner more efficiently. Therefore, for example, it is assumed that the capacity of the air conditioner is set to 100% if the number of persons is equal to or more than the first threshold value, but 80% if the number of persons is less than the first threshold value. In this case, the processor 21 controls the air conditioner controller 6 to reduce the capacity of the air conditioner by 20% if the value of the column 2425 is smaller than the first threshold value. Further, the processor 21 sets the information about the column 2426 in the room-specific management table 242 to 80%.

The processor 21 performs lighting control as ACT 37. For example, the processor 21 confirms whether the value of the column 2425 in the room-specific management table 242 of the room A is "0". If the value of the column 2425 is "0", it can be estimated (assumed) that there is no person in the room A. An operation to turn off the lighting if there is no person in the room is set. In this case, the processor 21 controls the lighting controller 5 to turn off the lighting fixture if the value of the column 2425 is "0". Further, the processor 21 sets the information about the column 2427 in the room-specific management table 242 to "OFF".

In this way, the processor 21 of the server 2 controls the lighting controller 5 and the air conditioner controller 6, which are control targets, in real time based on the number of the specific wireless devices 30 counted in the room-specific management table 242.

Here, the processor 21 realizes the function of the control portion 215 by executing the process of ACT 36 and ACT 37.

After finishing the processes of ACT 36 and ACT 37, the processor 21 proceeds to ACT 38. The processor 21 updates the monitoring image as ACT 38. The monitoring image is an image (screen image) displayed on the display device of the monitoring device 7. With the above, the processor 21 ends the log analysis process. If the log analysis process is ended, the processor 21 ends the second information process.

Figure 12:
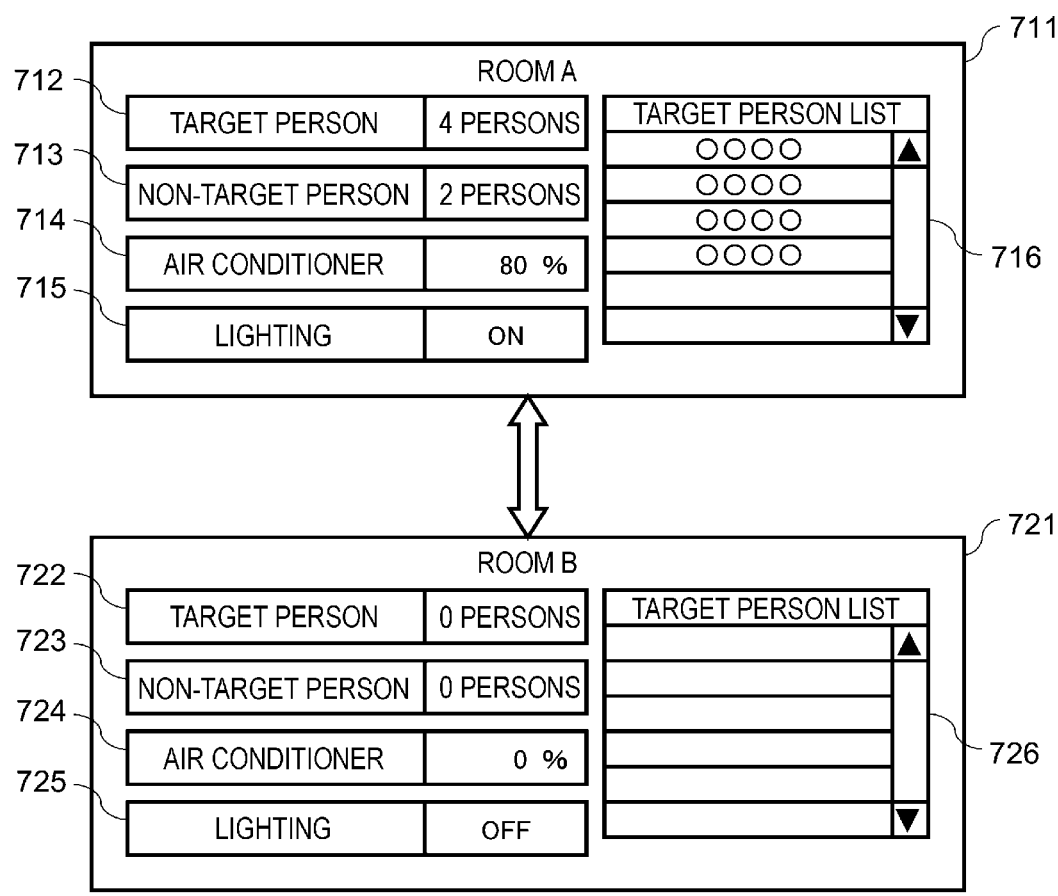
FIG. 12 is an example of a monitoring screen displayed on a monitoring device.

FIG. 12 is an example of the monitoring image. FIG. 12 illustrates a monitoring image 711 for the room A and a monitoring image 721 for the room B. The monitoring device 7 selectively displays the monitoring image 711 and the monitoring image 721. If the room A is selected by the operation input to the input device, the monitoring device 7 displays the monitoring image 711. Similarly, if the room B is selected, the monitoring device 7 displays the monitoring image 721. The monitoring device 7 may display the monitoring image 711 and the monitoring image 721 on the same screen.

The monitoring image 711 includes a target person area 712, a non-target person area 713, an air conditioner area 714, a lighting area 715, and a target person list area 716. The monitoring image 721 also includes a target person area 722, a non-target person area 723, an air conditioner area 724, a lighting area 725, and a target person list area 726.

In the target person area 712 or 722, the total value of the columns 2423 in the room-specific management table 242 of the corresponding room is displayed. In the non-target person area 713 or 723, the total value of the columns 2424 in the room-specific management table 242 of the corresponding room is displayed. In the air conditioner area 714 or 724, the information about the column 2426 in the room-specific management table 242 of the corresponding room is displayed. In the lighting area 715 or 725, the information about the column 2427 in the room-specific management table 242 of the corresponding room is displayed.

In the target person list area 716 or 726, the names of target persons of the number of persons corresponding to the number of target persons are displayed. As described above, the management data 2441 used for updating the room-specific management table 242 in the second information process of this cycle is recorded in the management data file 244. The processor 21 selects the management data 2441 in which the target person and non-target person identification flag indicates the target person from the recorded the management data 2441, searches the management target person database 241 with the communication address of the selected management data 2441, and acquires the names of the target persons. The processor 21 generates a target person list with the names and displays the target person list in the target person list area 716 or 726.

Effect of Office Device System

According to an office device system 100 of an embodiment, an MFP 1 can be used to count the number of specific wireless devices 30 in a place (e.g., room A, room B, or the like) where a MFP 1 is installed. Such information can be tracked over time in chronological order. Here, by setting the specific wireless device 30 to be a type such as a smartphone or a tablet terminal normally carried by a person, the number of such persons in the place where the MFP 1 is installed can be counted. Then, the air conditioner or the lighting fixture can be more efficiently controlled according to the detected number of persons carrying a wireless device 30.

Further, the communication address of the wireless device 30 can be used to identify whether the person carrying the wireless device 30 is a management target person. Therefore, it is possible to identify whether there is a management target person (registered person) in the place where the MFP 1 is installed. For example, if the place where the MFP 1 is installed is a classroom and an enrollee who takes a class in the classroom is the management target person, the attendance of the enrollee can be tracked. It is also possible to specify whether there is a person other than a management target person in the place where the MFP 1 is installed. Therefore, if the place where the MFP 1 is installed does not allow people other than the management target persons to enter the room, by monitoring the monitoring images 711 and 721, it is possible to determine whether a suspicious person invades the controlled area.

Thus, according to an embodiment, it is possible to provide an office device system 100 capable of monitoring the place where the MFP 1 is installed. Further, it is possible to provide an MFP 1 which can be used for monitoring an installation location. Further, it is possible to provide a method of controlling other devices or equipment by (e.g., air conditioners, light fixtures) effectively using the MFP 1 as person sensor or the like. A management method for tracking positions wireless devices 3 using an MFP 1 is also provided.

Modification Example of Office Device System

An embodiment of an office device system is described above, but the present disclosure is not limited to this example.

For example, the office device is not limited to an MFP 1. Any office device such as a commercial copier, a printer, a facsimile machine, and the like, which may be installed and used in a predetermined place may be used in a manner corresponding that described above for an MFP 1.

The control targets are not limited to the lighting controller 5 or the air conditioner controller 6. That is, the devices or equipment to be controlled on the basis of information provided by the MFP 1 (or other office device) are not limited to lights and air conditioners. For example, the operation level or operation on and off of a dehumidifier, an air purifier, and the like may be controlled according to the number of persons in a room or other location.

In some examples, only one office device need be present in a room (or location) particularly if a connectable range of the office device using Bluetooth or the like covers almost the entire area of the room, an office device system can still be configured by the server 2 and just the one office device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An office device, comprising:
a communication unit configured to wirelessly communicate with a wireless device using a predetermined wireless communication standard; and
a processor configured to:
periodically search for wireless devices within a communication range of the communication unit;
acquire identification information from each wireless device detected in the search for wireless devices; and
output search data including the identification information to a server.

2. The office device according to claim 1, wherein the output search data further includes a radio wave reception intensity for each wireless device detected in the search.

3. The office device according to claim 1, wherein the predetermined wireless communication standard is a Bluetooth protocol.

4. The office device according to claim 1, further comprising:

an image forming engine configured to print images on a sheet.

5. An office device system, comprising:
an office device according to claim 1; and
a server configured to:
  collect the search data output from the office device,
  count the number of the wireless devices within the communication region of the communication unit based on the collected search data, and
  control a target apparatus based on the counted number of wireless devices.

6. The office device system according to claim 5, wherein the target apparatus is an air conditioning unit for the location at which the office device is installed.

7. The office device system according to claim 5, wherein the target apparatus is a lighting fixture at the location at which the office device is installed.

8. An office device system, comprising:
an office device according to claim 1; and
a server configured to:
  collect the search data output from the office device,
  determine whether each wireless device in the search data is a managed wireless device based on the identification information included in the collected search data,
  count the number of managed wireless devices in the search data, and
  obtain the total number of wireless devices in the search data.

9. The office device system according to claim 8, wherein the server is further configured to:
control a target apparatus based on the total number of wireless devices.

10. The office device system according to claim 8, wherein
the server stores authorized user identifications in association with identification information for wireless devices, and
the determining of whether each wireless device in the search data is a managed wireless device is based on a comparison of the identification information included in the collected search data to the identification information for wireless devices stored in association with the authorized user identifications.

11. The office device system according to claim 10, wherein the server is further configured to:
control a target apparatus based on the total number of wireless devices.

12. A control method for controlling a target apparatus, the control method comprising:
controlling an office device to periodically search for wireless devices within a communication range of a short-range wireless communication unit of the office device and to acquire identification information from each wireless device detected in the search for wireless devices;
output search data including the identification information to a server;
collect, at the server, the search data output from the office device;
determine whether each wireless device in the search data is a managed wireless device based on the identification information included in the collected search data;
count the number of managed wireless devices in the search data;
obtain the total number of wireless devices in the search data; and
control a target apparatus based on at least one of the counted number of managed wireless devices or the total number of wireless devices in the search data.

13. The control method according to claim 12, wherein the target apparatus is an air conditioning unit.

14. The control method according to claim 12, wherein the target apparatus is a lighting fixture.

15. The control method according to claim 12, wherein the office device is a multifunction peripheral device.

16. The control method according to claim 12, wherein the short-range wireless communication unit is a Bluetooth communication unit.

17. The control method according to claim 12, wherein the output search data further includes a radio wave reception intensity for each wireless device detected in the search.

18. A wireless device tracking method using an office device as a sensor, the method comprising:
controlling an office device to periodically search for wireless devices within a communication range of a short-range wireless communication unit of the office device and to acquire identification information from each wireless device detected in the search for wireless devices;
output search data including the identification information to a server;
collect, at the server, the search data output from the office device;
determine whether each wireless device in the search data is a managed wireless device based on the identification information included in the collected search data; and
count the number of managed wireless devices in the search data.

19. The method according to claim 18, wherein the short-range wireless communication unit is a Bluetooth communication unit.

20. The method according to claim 18, wherein the output search data further includes a radio wave reception intensity for each wireless device detected in the search.

* * * * *